United States Patent Office 3,356,940
Patented Dec. 5, 1967

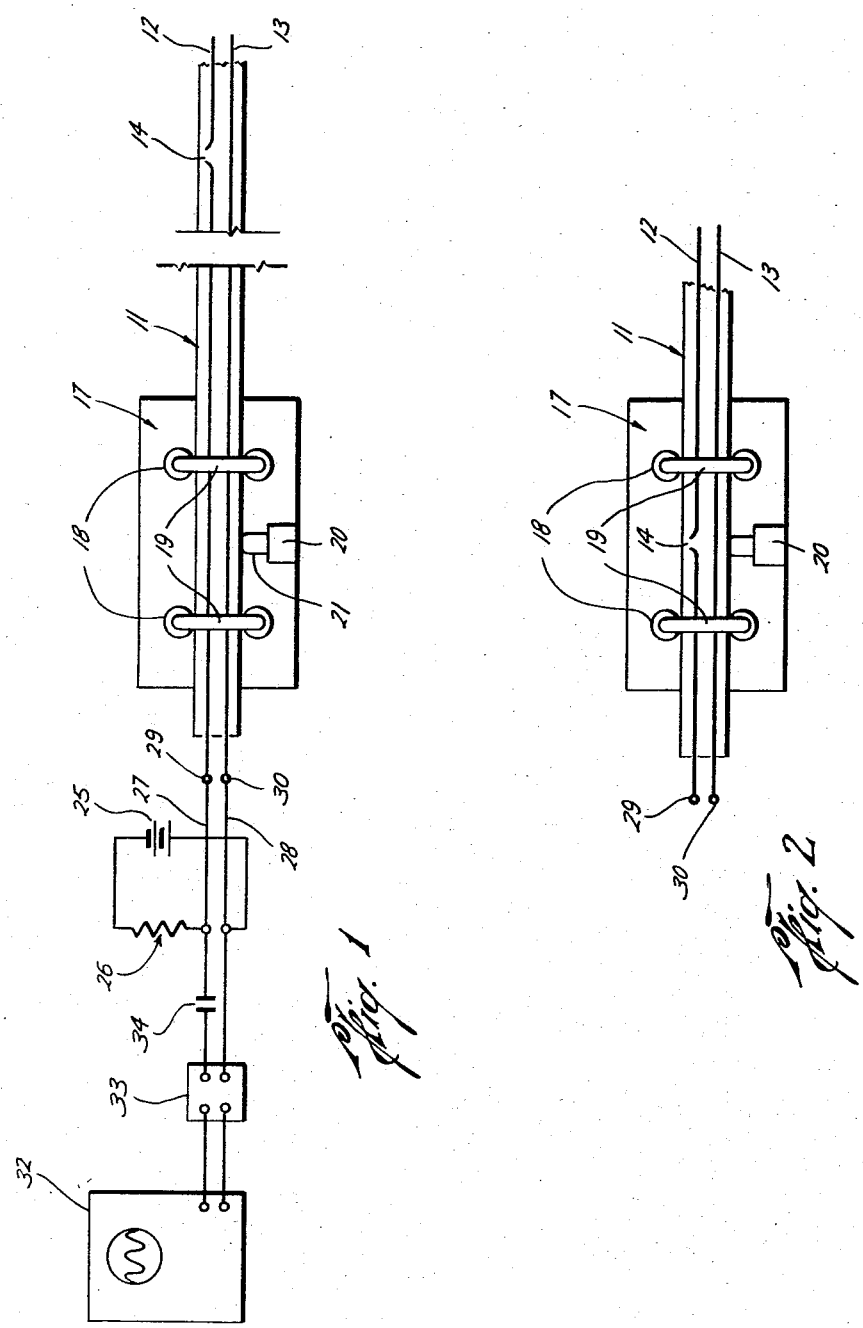

3,356,940
METHOD AND APPARATUS FOR LOCATING A BROKEN CONDUCTOR IN A CABLE BY VIBRATING A SECTION OF THE CABLE
George E. La Frentz, Houston, Tex., assignor to Schlumberger Technology Corporation, Houston, Tex., a corporation of Texas
Filed May 5, 1966, Ser. No. 547,994
10 Claims. (Cl. 324—52)

ABSTRACT OF THE DISCLOSURE

The particular embodiment described herein as illustrative of one form of the method and apparatus of the invention includes forming an electrical circuit of conductors in a cable including a broken conductor and applying a direct current voltage to the conductors. Successive sections of the cable are passed over vibrating means to produce minute variations in the spacings between individual conductors, which in turn result in small variations in the capacitance therebetween. A tuned detector circuit generates a read-out signal indicative of such variations. When the section of the cable having an open conductor passes the vibrating means, the capacitive circuit is no longer being vibrated and thus no read-out signal is generated, thereby indicating the location of the conductor break.

This invention relates to a method and apparatus for locating a break in a conductor in a cable having at least two conductors. More particularly, this invention relates to a novel method and apparatus for locating a break in an insulated conductor in a cable having at least two such insulated conductors.

It often develops that a cable having a plurality of conductors therein, each of which is insulated from the other, will develop a break such that electrical signals may not be transmitted therethrough. Since the conductors are insulated it is important that the location of the break be determined in a nondestructive manner and that it be located precisely so that the repairs thereto may be made without damaging a large portion or section of the conductor and cable.

Prior art techniques which are available to the wire manufacturing industries and to companies using electrical cables for locating open or broken conductors, include primarily the use of an apparatus and method for making accurate capacity measurements from either end or both ends of the cable. From these measurements, the location of the broken or open conductor is then computed. It has been found that the accuracy of such devices is only within about one percent. Therefore, in the case of cable 20,000 feet long, this locates the fault no more closely than 200 feet. Present day repair techniques require that the fault be located within a matter of inches. Consequently, the foregoing method and apparatus is grossly inadequate for the needs of the industry at the present time.

Other methods for locating open circuits include driving the defective cable having the conductors therein with an AC signal and trying to detect the electromagnetic field generated by the capacitive charging current between the pair of conductors. This system is also inaccurate since the capacitative current becomes less and less as the cable fault is approached. The accuracy of this system is somewhat better than the capacitative system described above since, generally, opens can be located within several feet. It is still inadequate, however, for present day repair methods and it is further ineffective in cables containing a large number of pairs due to problems associated with cross-talk between the various conductors.

It is therefore, an object of the present invention to provide an improved method and apparatus for locating a break in a conductor in a cable having two or more conductors, which method and apparatus will locate the break within a matter of inches without damage to the cable and which will overcome the shortcomings of the prior art noted above.

Briefly stated, the method of this invention comprises the steps of connecting the conductors to form an electrical circuit. An electrical voltage is applied to the circuit and the cable is then moved axially relative to a vibration means to vibrate a section of the cable. Such vibration varies the spacing between the conductors at the point of vibration, thereby producing variations in an electrical parameter of the circuit. Thereafter the variations in the electrical parameter are monitored during the relative movement. The changes in the monitored variations are then detected as an indication of the location of a break.

Briefly stated, an apparatus for carrying out the aforesaid method comprises in combination means for applying an electrical voltage across the conductors to form a circuit. Vibration means are mounted for relative axial movement with respect to the cable for vibrating a section of the cable to vary the relative spacing between the conductors, which in turn produces variations in an electrical parameter of the circuit. The apparatus also includes means for causing relative axial movement of the cable with respect to the vibration means and means for monitoring the variations in an electrical parameter of the circuit and reading out a change in the variations as an indication of the location of a break in one of the conductors in the cable.

Reference to the drawings will further explain the invention wherein:

FIG. 1 is a block diagram in schematic form showing one embodiment of the apparatus of this invention.

FIG. 2 is a fragmented view of the vibration means shown in FIG. 1.

Referring now to the drawings, armored or insulated cable 11 is generally shown as having conductors 12 and 13 therein each of which is appropriately insulated. Conductor 12 is shown as having an open or break 14 which it is desired to detect or locate.

The cable is shown as mounted for relative movement through vibration means including cable mounting device 17 which supports two pairs of spaced apart rollers 18. The rollers of each pair are connected by a support 19, which is adapted to overlie cable 11, such that cable 11 is held between rollers 18.

Cable mounting device 17 has attached thereto vibrator 20 which is adapted to vibrate at a predetermined and preferably uniform frequency. Vibrator 20 may be an air actuated vibrator or other mechanical agitation means such as an eccentric cam wheel and arm arrangement. In any event, it is desirable to have the vibration means adapted such that it can be set to a predetermined frequency. Vibrator 20 has a vibration contact arm 21 which is adapted to impart vibration to a section of the cable 11 moving between the pairs of rollers 18. Hence, it may be stated that cable 11 is adapted for relative axial movement with respect to the vibration means.

One means of moving the cable relative to the vibration means is to have cable 11 supported at each end by reels, whereby the cable then may be wound on to one reel and off of the other reel. In this instance one of the reels would be provided with two slip rings, each of which is connected to one end of one of the conductors in a conventional manner.

Means are provided for applying an electrical voltage across the conductors 12 and 13, which means conveniently takes the form of high voltage source 25 connected in series with a large resistor 26. The voltage applying means is connected with leads 27 and 28 which in turn are connected respectively to conductors 12 and 13 at contact points 29 and 30. It is to be understood that contact points 29 and 30 might be brushes attached to the slip rings referred to above.

Monitoring means are also provided for detecting variations in an electrical parameter of the circuit, which variations are caused by vibration of a section of cable 11. This monitoring means conveniently takes the form of an oscilloscope 32 or other sensing device which is connected to variable filter 33 which is also connected to leads 28 and 29. Lead 28 may conveniently have a DC blocking condenser 34 provided between resistor 26 and oscilloscope 32.

In a typical embodiment of the invention, condenser 34 might have the value of .01 mf.; resistor 26 might be the size of 1 meg.; voltage source 25 could be any convenient DC source producing 100 volts; and vibrator 20 would be adapted to operate at variable frequencies depending upon the size of the cable being tested. It has been found that a frequency of a few hundred cycles per second will work satisfactorily. It is apparent that other frequencies might be used, depending upon the mass and size of cable without any change in the principal involved in this invention.

In operation, cable 11 is moved relatively to vibrator 20 and within the confines of spaced rollers 18. While so moving, vibrator 20 will be set to a preselected frequency to thereby vibrate a portion or section of cable 11. This vibration of the cable causes minute variations in conductor spacing between conductors 12 and 13, which in turn results in small variations in conductor capacitance. As capacitance is varied at the preselected frequency as a result of the vibration, the voltage across the cable will be subjected to minute changes at the same frequency. Filter 33 is of the adjustable type and would be set or tuned to the same frequency as vibrator 20, with the result that an AC signal will appear on oscilloscope 32. As cable 11 is moved relative to vibrator 20, the signal on the oscilloscope will continue to appear until the point is reached where the open 14 is encountered, assuming that cable 11 were moved right to left as shown in FIG. 1 to the position shown in FIG. 2.

As soon as open 14 passed by vibrator 20 there would no longer be a signal generated and hence, no read-out on the oscilloscope 32. Thus, it may be stated that oscilloscope 32 is adapted to read-out the changes in variations in capacitance caused by vibrator 20 in the circuit.

The accuracy of locating the open can therefore be controlled by the width of the spacing between pairs of rollers 18, which in a practical case can be within less than a few inches. This system therefore provides a method of meeting the requirements necessary for present cable repair technique and is suitable for continuous, reliable and practical shop conditions. It is to be understood that the vibration means could be adapted to move along a fixed cable but nevertheless, it will be described as being a relative movement with respect to the cable.

It will be understood that while in the embodiment shown, the oscilloscope 32 is sensing changes in voltage caused by changes in capacitance, which in turn are caused by the variations in spacing between the conductors 12 and 13, other parameters of an electrical circuit could be tested. For example, changes in current caused by the variations in capacitance could also be tested, as well as phase angle.

It is to be understood that each of the conductors 12 and 13 acts as a plate of a capacitor with the insulating material therebetween acting as a dielectric. Resistor R26 is chosen so that the time constant (R26 times the capacitance between conductors 12 and 13) is large, for example greater than three times, compared with the period of vibrator 20. This insures that a constant charge is maintained between conductors 12 and 13 as the capacity varies. The charge on the circuit is expressed as follows:

$$Q = CV \quad (1)$$

Where Q is charge between conductors 12 and 13, C is capacitance between conductors 12 and 13, and V is voltage across conductors 12 and 13. Equation 1 shows that the voltage will vary directly as the capacitance since the charge is constant.

It is also to be understood that other detecting devices or read-out devices can be used. For example, a galvanometer, bell or other signal might be used to indicate a loss of signal which would indicate the open 14. Other type read-out devices which might be used include a volt meter or an ammeter or the like in measuring various parameters of the circuit. It is to be understood that with respect to the monitoring of the specified frequency, monitoring could also be made on the harmonic thereof, but this will still be understood to mean monitoring the variations in capacitance and voltage as referred to above.

Basically, it is to be understood that the idea consists of a method and apparatus for accurately locating in a cable an open conductor therein through the sensing of small signals that are generated through the mechanical agitation of the cable.

Further modifications may be made in the invention as particularly described. Accordingly, the foregoing description is to be construed illustratively only and is not to be construed as a limitation upon the invention as defined in the following claims.

What is claimed is:

1. The method of locating a break in a conductor in a cable having at least two conductors, comprising the steps of:
   connecting the conductors to form an electrical circuit;
   applying a voltage to the circuit;
   moving the cable axially relative to vibration means while vibrating a section of the cable with such vibration means to vary the spacing between the conductors at the point of vibration, thereby producing variations in an electrical parameter of the circuit;
   monitoring said variations in said electrical parameter during the relative movement; and
   detecting a change in the monitored variations as an indication of the location of a break.

2. The method of locating a break in an insulated conductor in a cable having at least two insulated conductors comprising the steps of:
   applying an electrical voltage across the conductors;
   moving the cable axially relative to vibration means while vibrating a section of the cable with such vibration means to vary the spacing between the conductors at the point of vibration, thereby producing variations in the electrical capacitance of the conductors;
   monitoring said variations in capacitance caused by the vibration; and
   detecting a change in the monitored variations as an indication of the location of a break.

3. The method of locating a break in an insulated conductor in a cable having at least two conductors, comprising the steps of:
   placing an electrical voltage across the conductors;
   moving the cable axially relative to vibration means while vibrating a section of the cable with such vibration means at a predetermined frequency to vary the spacing between the conductors at the point of vibration, thereby producing variations in an electrical parameter of the conductors, which variations have a predetermined frequency;
   monitoring said variations during the relative movement; and
   detecting a change in the monitored variations as an indication of the location of a break.

4. The method of locating a break in an insulated conductor in a cable having at least two insulated conductors, comprising the steps of:
  placing an electrical voltage in series with a resistor across the conductors;
  passing the cable axially relative to vibration means having a predetermined frequency, vibrating a section of the cable with such vibration means to vary the conductor spacing at the point of vibration to produce variations in conductor capacitance, thereby producing variations in voltage in the conductors at the said frequency;
  monitoring said variations in voltage during the relative movement; and
  detecting a change in the monitored variations as an indication of the location of a break.

5. The method as claimed in claim 4 wherein said monitoring includes the step of filtering said voltage variations and applying said filtered voltages to read-out means.

6. An apparatus for locating a break in a cable having at least two conductors, comprising in combination:
  means for applying an electrical voltage across the conductors;
  vibration means mounted for relative axial movement with respect to the cable for vibrating a section of the cable to vary the spacing between the conductors, to thereby produce variations in an electrical parameter of the circuit;
  means for causing relative axial movement of the cable with respect to the vibration means; and
  means for monitoring said variations in an electrical parameter of the circuit and reading out a change in said variations as an indication of the location of a break in one of the conductors in the cable.

7. An apparatus for locating a break in a cable having at least two insulated conductors, comprising in combination:
  means for applying an electrical voltage across the conductors;
  vibration means mounted for relative axial movement with respect to the cable for vibrating a section of the cable to vary the spacing of the conductors at the point of vibration to produce variations in the electrical capacitance of the conductors;
  means for causing relative axial movement of the cable with respect to the vibration means; and
  read-out means for monitoring changes in an electrical parameter of the circuit caused by said variations in electrical capacitance as an indication of a break in a conductor.

8. An apparatus for locating a break in a conductor in a cable having at least two conductors, comprising in combination:
  means for placing an electrical voltage across the conductors to form an electrical circuit;
  vibration means having a predetermined frequency mounted for relative axial movement adjacent to the cable for vibrating a section of the cable to thereby vary the spacing between the conductors at the point of vibration to create variation in capacitance between the conductors;
  means for causing relative axial movement of the cable with respect to the vibration means; and
  detector means for detecting changes in an electrical parameter of the circuit caused by said vibrations in capacitance as an indication of the location of the break.

9. An apparatus for locating a break in an insulated conductor in a cable having at least two insulated conductors, comprising in combination:
  a voltage source adapted for connection in series with a resistance across the conductors to form an electrical circuit therewith;
  vibration means having a predetermined frequency mounted for relative axial movement adjacent to the cable for vibrating a section of the cable to thereby vary the spacing between the conductors at the point of vibration to create variations in capacitance between the conductors at the said frequency;
  means for causing relative axial movement of the cable with respect to the vibration means; and
  detector means connected to the conductors for detecting changes in variations in voltage caused by said variations in capacitance as an indication of the location of the break in a conductor.

10. The apparatus as claimed in claim 9 including:
  filter means connected between said conductors and said detector means for passing changes in voltage only at said predetermined frequency.

References Cited

UNITED STATES PATENTS

| | | | |
|---|---|---|---|
| 2,494,595 | 1/1950 | Taylor et al. | 324—52 |
| 2,611,805 | 9/1952 | Osborn et al. | 324—52 |
| 3,126,579 | 3/1964 | Janszen | 73—67 X |
| 3,143,702 | 8/1964 | Kohler et al. | 324—73 |
| 3,267,369 | 8/1966 | McLoad | 324—54 |

FOREIGN PATENTS

| | | |
|---|---|---|
| 1,131,700 | 2/1957 | France. |
| 853,317 | 10/1952 | Germany. |
| 358,677 | 10/1931 | Great Britain. |
| 576,708 | 4/1946 | Great Britain. |
| 767,558 | 2/1957 | Great Britain. |

RUDOLPH V. ROLINEC, *Primary Examiner.*

G. R. STRECKER, *Assistant Examiner.*